US011514539B2

(12) United States Patent
So et al.

(10) Patent No.: US 11,514,539 B2
(45) Date of Patent: Nov. 29, 2022

(54) PRIORITIZATION AND AUTOMATION OF BILLING DISPUTES INVESTIGATION USING MACHINE LEARNING

(71) Applicant: FLOWCAST, INC., Burlingame, CA (US)

(72) Inventors: Kenneth So, Burlingame, CA (US); James Patrick McGuire, Cedar Glen, CA (US); Kathryn Rungrueng, San Francisco, CA (US)

(73) Assignee: Flowcast, Inc., Burlingame, CA (US)

( * ) Notice: Subject to any disclaimer, the term of this patent is extended or adjusted under 35 U.S.C. 154(b) by 314 days.

(21) Appl. No.: 16/452,966

(22) Filed: Jun. 26, 2019

(65) Prior Publication Data

US 2019/0392538 A1 Dec. 26, 2019

Related U.S. Application Data

(60) Provisional application No. 62/689,837, filed on Jun. 26, 2018.

(51) Int. Cl.
*G06Q 50/18* (2012.01)
*G06Q 30/00* (2012.01)
*G06Q 30/04* (2012.01)

(52) U.S. Cl.
CPC ......... *G06Q 50/182* (2013.01); *G06Q 30/016* (2013.01); *G06Q 30/04* (2013.01)

(58) Field of Classification Search
CPC ..... G06Q 50/182; G06Q 30/016; G06Q 30/04
See application file for complete search history.

(56) References Cited

U.S. PATENT DOCUMENTS

| 7,630,903 | B1 | 12/2009 | Vaidyanathan et al. |
| 7,966,192 | B2 | 6/2011 | Pagliar et al. |
| 8,061,597 | B2 | 11/2011 | Hogg et al. |
| 8,484,071 | B1* | 7/2013 | Lybrook ............ G06Q 30/0282 705/7.36 |
| 9,529,851 | B1* | 12/2016 | Smith ...................... H04L 63/04 |
| 11,288,720 | B1* | 3/2022 | Vasudevan ............. G06N 20/00 |
| 2014/0236848 | A1 | 8/2014 | Abhyanker |
| 2016/0005049 | A1* | 1/2016 | Menezes ............ G06Q 10/0635 705/7.28 |
| 2016/0080567 | A1* | 3/2016 | Hooshiari ............. H04M 3/493 379/88.01 |

(Continued)

*Primary Examiner* — Fateh M Obaid
(74) *Attorney, Agent, or Firm* — Kanika Radhakrishnan; Evergreen Valley Law Group

(57) ABSTRACT

The present disclosure provides a computer-implemented method, which includes receiving a dispute information pertaining to a billing dispute by a processor, from a device associated with a customer. The method includes computing, by the processor, a score based on the dispute information, for determining validity of the billing dispute. The billing dispute is categorized based on the score computed for the dispute information. One or more actions are subsequently presented to one or more parties associated with the dispute information for resolving the billing dispute. The processor is also configured to prioritize the one or more actions based on the score computed. The present disclosure also provides a system capable of implementing the aforesaid method for prioritizing and resolving the billing disputes in an automated manner.

20 Claims, 12 Drawing Sheets

(56) References Cited

U.S. PATENT DOCUMENTS

| | | | | |
|---|---|---|---|---|
| 2016/0127808 A1* | 5/2016 | Wong | ............... | H04M 15/08 |
| | | | | 379/112.04 |
| 2016/0140846 A1* | 5/2016 | Outwater | ............... | G08G 1/144 |
| | | | | 340/932.2 |
| 2016/0189317 A1* | 6/2016 | Papandrea | ............. | G16H 10/60 |
| | | | | 705/319 |
| 2016/0212064 A1* | 7/2016 | Biswas | ............... | H04L 67/10 |
| 2016/0259834 A1* | 9/2016 | Bishop | ............... | G06F 11/3034 |
| 2016/0292681 A1* | 10/2016 | Bryson | ............... | G06Q 20/405 |
| 2016/0300214 A1* | 10/2016 | Chaffin | ............... | G06Q 20/22 |
| 2019/0043125 A1 | 2/2019 | Cropper | | |
| 2019/0066013 A1* | 2/2019 | Gupta | ............... | G06N 3/006 |
| 2019/0180395 A1* | 6/2019 | Moretti | ............... | G06Q 50/182 |
| 2020/0226503 A1* | 7/2020 | Subramanian | ......... | G06Q 30/04 |
| 2020/0265393 A1* | 8/2020 | Shah | ............... | G06F 16/9035 |

\* cited by examiner

| | SCORE BAND | ACTION (PREDICT) | PREDICTION |
|---|---|---|---|
| 1202a | 5 | AUTO-CLAIM (INVALID) | 95%+ CHANCE IT'S INVALID |
| 1202b | 4 | INVESTIGATE | MEDIUM CHANCE IT'S INVALID |
| 1202c | 4 | INVESTIGATE | MEDIUM CHANCE IT'S INVALID |
| 1202d | 3 | INVESTIGATE | LOW CHANCE IT'S INVALID |
| 1202e | 3 | INVESTIGATE | LOW CHANCE IT'S INVALID |
| 1202f | 2 | INVESTIGATE | HIGH CHANCE IT'S VALID |
| 1202g | 2 | INVESTIGATE | HIGH CHANCE IT'S VALID |
| 1202h | 1 | AUTO-CLEAR (VALID) | 98%+ CHANCE IT'S VALID |

PRIORITIZATION AND AUTOMATION OF BILLING DISPUTES INVESTIGATION USING MACHINE LEARNING

TECHNICAL FIELD

The present disclosure relates to a billing dispute management system and, more particularly, relates to automating the billing dispute management system using machine learning techniques.

BACKGROUND

A customer upon purchase of goods or services from a seller, a bill or an invoice is typically provided to the customer for recording the transaction. The bill includes details pertaining to the timestamp of the transaction, items purchased, price or cost of the purchased product, etc. At times, the customer may claim that there are discrepancies in the transaction, for instance undelivered items by the seller, incorrect quantity or pricing of the items delivered, damaged goods and so on. In such circumstances, the customer typically pays a part of the bill and initializes a claim on the disputed items. The seller then chooses to either accept or investigate the claim made by the customer. The outcome of the investigation can either be acceptance of the claim and clearing the balance or disputing the customer's claim and requiring further information and/or payment of the balance.

The seller generally accesses the claim made by the customer via a computing device, which is configured to manage and investigate billing disputes. Dollar thresholds and other customer-specific rules are typically applied for auto-clearing some of the disputes. The remaining disputes are channeled into a queue, where an agent is initiated for investigating the claim made by the customer. In the process, the agent is required to collate all the available information from various sources manually, and review each of the documents such as but not limiting to the bill, a dispute note, shipping and delivery documents, pricing sheets, correspondence with the customer and the like, for determining the validity and root cause of the claim. Additionally, during the investigation the agent is required to have multiple communication exchanges, which is a cumbersome and an ineffective process of investigating the claim made by the customer. Moreover, due to such cumbersome techniques employed for investigation, the disputes may often be closed arbitrarily. Thus, the existing investigation techniques are cumbersome and labor intensive, which is undesirable.

To overcome the aforementioned problems, presently, box cuts and business rules are implemented, which reduce the workload of investigating with little rationale. Several corporates have also hand-crafted, highly manual solutions and software offerings that help automate parts of the process through Robotic Process Automation (RPA), such as identifying proper reason codes to streamline investigation. However, these solutions operate in a haphazard manner in the likelihood of invalidity of the claim, which creates inefficiency in the processing of the disputes.

Therefore, there exists a need for techniques, which can overcome one or more limitations stated above, in addition to providing other technical advantages.

SUMMARY

Various embodiments of the present disclosure provide methods and systems for prioritizing and resolving billing disputes.

The present disclosure provides a computer-implemented method, which includes receiving a dispute information pertaining to a billing dispute by a processor, from a device associated with a customer. A score is computed based on the dispute information, for determining validity of the billing dispute. The billing dispute based on the score computed for the dispute information, is categorized. One or more actions are subsequently presented to one or more parties associated with the dispute information for resolving the billing dispute.

The present disclosure also provides a system. The system includes a memory comprising stored instructions and a processor configured to execute the stored instructions to cause the system to perform at least receiving the dispute information pertaining to the billing dispute, from a device associated with the customer. The score is computed based on the dispute information, for determining validity of the billing dispute. The billing dispute based on the score computed for the dispute information, is categorized. The one or more actions are subsequently presented to one or more parties associated with the dispute information for resolving the billing dispute.

The present disclosure also provides another computer implemented method. The method includes receiving the dispute information pertaining to the billing dispute, from the device. One or more features are generated, based on the dispute information and a preset data for computing the score for the dispute information. The one or more features includes at least details pertaining to the dispute information provided by the customer, the details including a timestamp of the dispute information and a monetary information pertaining to the billing dispute. The one or more features also includes the dispute information received from the customer in a predetermined time period, and a billing dispute amount received by the customer over the predetermined time period. The score is thereafter computed based on the dispute information, for determining validity of the billing dispute. The billing dispute based on the score computed for the dispute information, is categorized. The dispute information is categorized into at least a valid billing dispute and an invalid billing dispute. Further, the processor is configured to generate a reason code for presenting one or more actions to one or more parties to resolve the billing dispute. The reason code includes explanation for categorizing the dispute information based on the computed score. The one or more actions are subsequently presented to one or more parties associated with the dispute information for resolving the billing dispute. The one or more actions includes at least complying with the billing dispute via one or more parties, when the dispute information is categorized as the valid billing dispute and investigating the dispute via the one or more parties, when the dispute information is categorizes as the invalid billing dispute. The processor thereafter is configured to prioritize the investigation of the billing dispute based on the score computed by the processor for the dispute information provided by the customer.

BRIEF DESCRIPTION OF THE DRAWINGS

For a more complete understanding of example embodiments of the present disclosure, reference is not made to the following descriptions taken in connection with the accompanying drawings in which.

Figure 1:
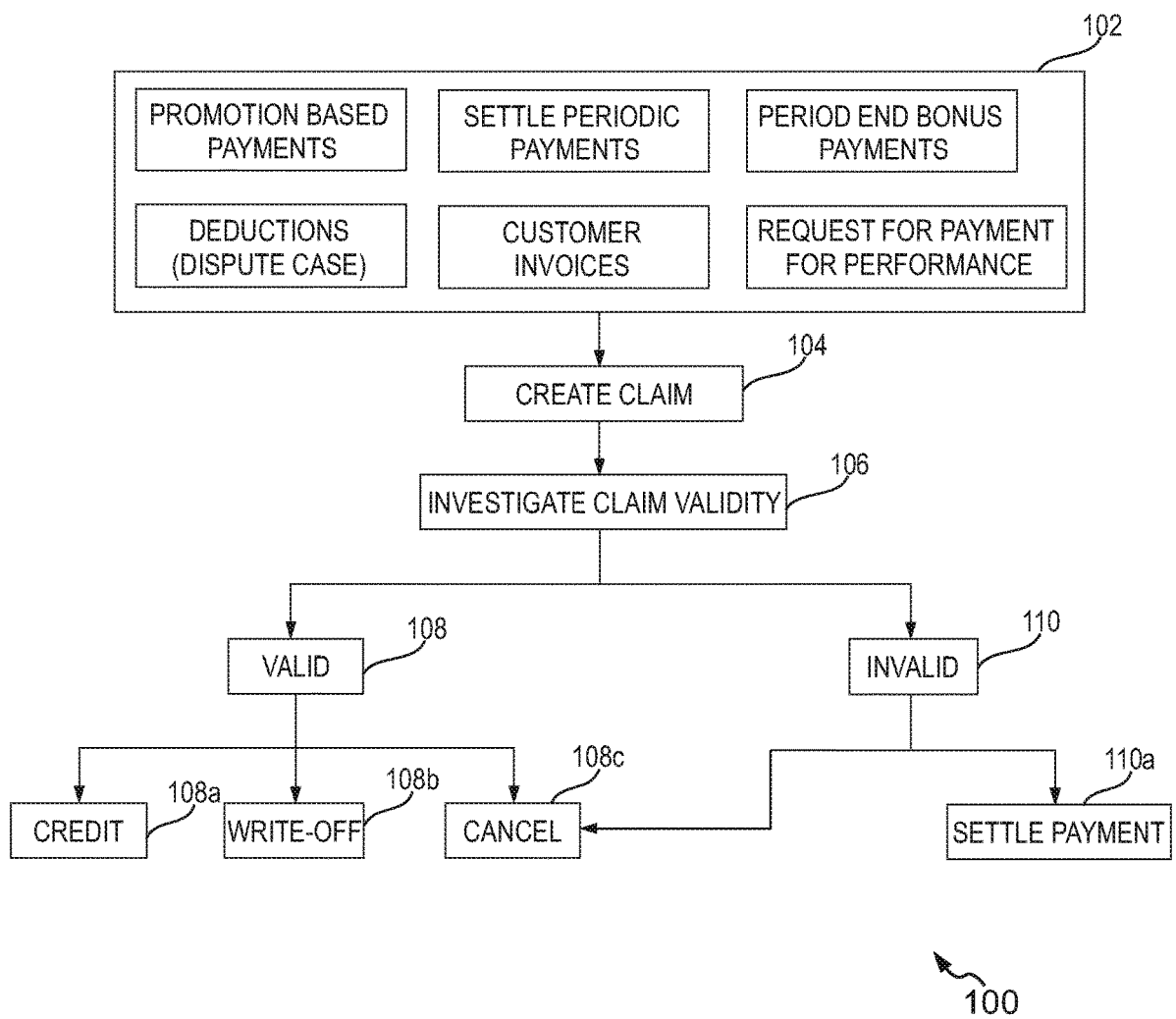
FIG. 1 is a schematic representation of a manual investigation process of a billing dispute in the prior art.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various embodiments of the present disclosure provide computer-implemented methods and systems for prioritizing and resolving billing disputes. Without loss of generality herein, the billing disputes may arise between a customer and a seller either via an in-person transaction or an online transaction. The system is configured to resolve the billing disputes using one or more machine learning techniques, thereby significantly reducing the manual effort for resolving each of the billing disputes. The method includes receiving by a processor associated with the system, dispute information pertaining to a billing dispute from a device associated with a customer. The dispute information provided by the customer may be one of invoice information, customer information, shipping information of a product, product information, sales team information and the like. The processor analyses the dispute information and computes a score for determining the validity of the billing dispute. The processor thereupon categorizes the billing dispute based on the computed score, wherein the categories may include segments or brackets, such as valid disputes and invalid disputes. The processor upon categorizing the billing disputes, presents one or more actions to one or more parties associated with the dispute information for resolving the billing dispute. The one or more actions may be auto-clearing or compensating the customer, when the billing dispute is categorized as the valid dispute. The one or more actions may also be to investigate the billing dispute via the one or more parties such as investigating agents, when the billing dispute is categorized as the invalid dispute. This process thus, ensures an automatic initiation of the billing disputes, without requiring the one or more parties to manually investigate each and every billing disputes.

The present disclosure also provides a system for prioritizing and resolving the billing disputes. The system includes processing capabilities for implementing the aforesaid method for prioritizing and resolving the billing disputes.

Although process steps, method steps or the like in the disclosure may be described in sequential order, such processes and methods may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention (s), and does not imply that the illustrated process is preferred.

Various embodiments with respect to methods and systems for prioritizing and resolving billing disputes are described in FIG. 1 to FIG. 14.

Figure 2:
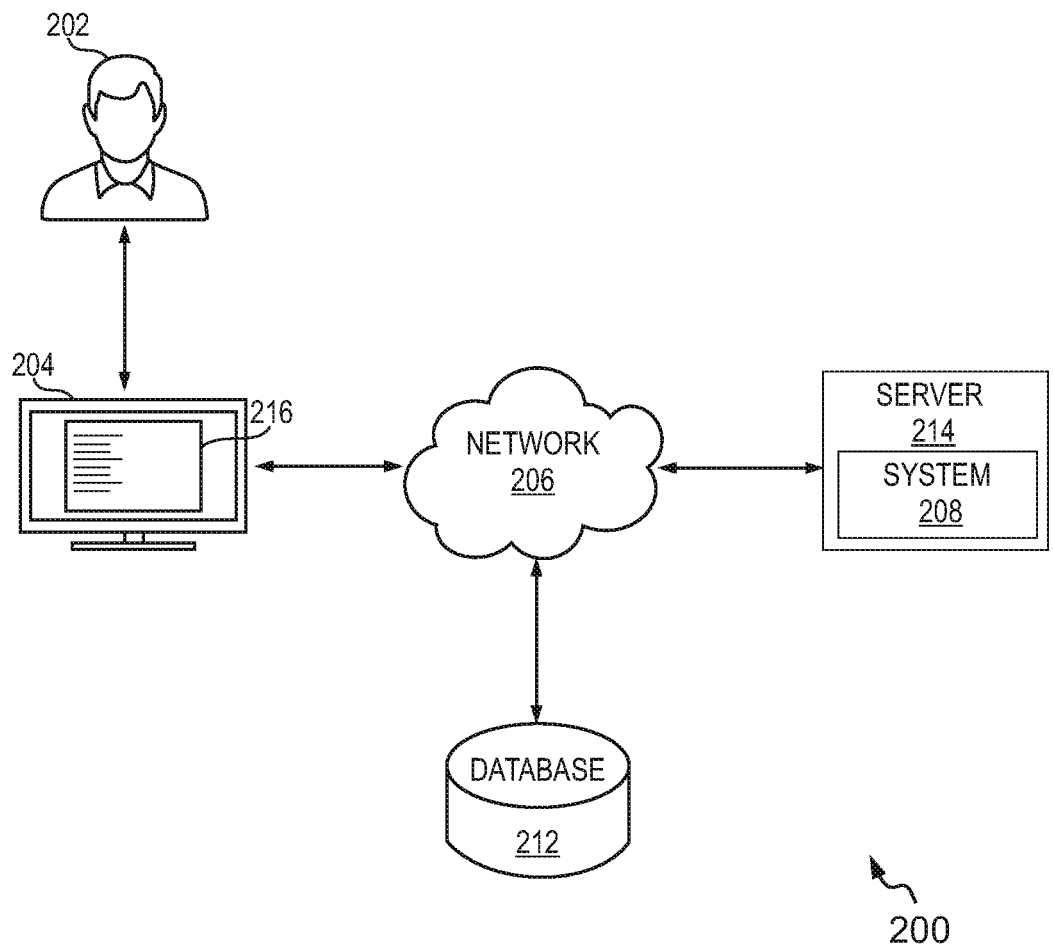
FIG. 2 is an example representation of an environment related to at least some example embodiments of the present disclosure.

FIG. 1 illustrates a block diagram 100 of a manual investigation process in the prior art. A customer 202 (for e.g. as shown in FIG. 2) provides a dispute information 102 for a billing dispute, through a user interface, which is explained in subsequent sections of the description. The billing dispute may be provided by the customer 202, upon noticing a discrepancy or a dispute in a transaction, such as an in-person transaction or an online transaction with a merchant or a seller (not shown in Figures). The dispute information 102 provided by the customer 202 may include an invoice information from a customer's invoice, deductions occurred in the transaction, a promotion-based payment information, a periodic payment information, a period end bonus payment information, a deduction information and the like, required for investigating and/or validating the dispute. Typically, the user interface works around the customer's dispute program and scoring performance. In one implementation, a manual entry of the dispute information 102 can be replaced through an Application Programming Interface (API) which is described in subsequent sections of the description.

Upon receiving the dispute information 102, a claim 104 is created on each dispute, which is typically associated with a bill (not shown in Figures) of the transaction. One or more parties (not shown in Figures) such as a customer care representative or a customer support expert, associated with the dispute, investigate the dispute or the dispute information 102 manually, for determining validity 106 of the claim 104. The manual investigation of the claim 104 determines whether the claim 104 is valid 108 or invalid 110. When the claim 104 is found to be valid 108, the customer 202 may choose to either credit 108a, write-off 108b or cancel 108c the claim 104. When the claim 104 is found to be invalid 110, the customer 202 may choose to either cancel 108c the claim 104 or settle 110a the payment suitably. Thus, in the existing manual investigation process, it is mandatory for investigating validity of each claim 104 and for determining the claims 104 to be accepted or rejected. The investigation effort balances expected invalid claim 104 amount versus cost of manpower or resources for the investigation.

FIG. 2 is an example representation of an environment 200 related to at least some example embodiments of the present disclosure. The environment 200 includes the customer 202 (collectively referred for plurality of customers) interacting with a system 208 for resolving the billing dispute. The customer 202 may be an individual or an entity, who purchases a product or a service from the seller or the merchant. The seller or the merchant may also be an individual or an entity, who may be selling the product or a service. The customer 202 is associated with a device 204, for providing the dispute information 102 (described in FIG. 1) to the system 208 via a network 206. The customer 202 may provide the dispute information 102 to the system 208 using an interactive analytic application 216 (hereinafter referred to as 'application 216') made available at the device 204. The device 204 may include devices, such as laptops, tablets, desktops, smartphones, wearable devices, workstation terminals or other computing devices with network interfaces such as micro-PCs, smart watches, etc. The network 206 may also be a centralized network or a decentralized network or may include a plurality of sub-networks that may establish a direct communication between the customer 202 and the system 208 or may offer indirect communication between the customer 102 and the system 208. Typical examples of the network 206 include, but are not limited to, a wireless or wired Ethernet-based intranet, a local or wide-area network (LAN or WAN), and/or global communications network known as the Internet, which may accommodate many different communications media and protocols.

The environment 200 also includes a server 214 (may also be referred to as a decision engine 214) configured for prioritizing and resolving the billing disputes. The server 214 may include the system 208 to act as a platform for prioritizing and resolving the billing disputes of the customer 202. The system 208 may be embodied within the server 214 or may be a standalone component associated with the server 214. The system 208 is configured to host and manage the application 216, which is accessible to the device 204. The application 216 may be accessible through a website associated with the server 214, so that the customer 202 may access the website over the network 206 using Web browser applications installed in the device 204 and, thereafter perceive to prioritize and resolve the billing disputes. In an embodiment, the server 214 is configured to facilitate instances of the application 112 to the device 204, upon receiving a request for accessing the application 216. The server 214 upon receiving the request allows instances of the application 216 to be downloaded into the device 204 for accessing the application 216. In an embodiment, the application 216 may include the Application Programming Interface (API) and other components, which may rest on the server 214. In this scenario, the application 216 can be made available at application stores, such as Google play store managed by Google®, Apple app store managed by Apple®, etc., and are downloadable from the application stores to be accessed on devices such as the device 204. In some alternate embodiments, the application 216 may be pre-installed on the device 204 as per the factory settings. In one configuration, the application 216 is also configured to generate and dynamically update a dashboard (not shown in Figures) by including the score computed by the system 208 for the dispute information 102 provided by the customer 202. In another configuration, the application 216 is also configured to generate and dynamically update the dashboard by including the category of the billing dispute based on the computations or analysis of the dispute information 102 by the system 208.

In an embodiment, the dispute information 102 may be provided by the customer 202 frequently via the application 216, and the scores computed by the system 208 may be fetched through another endpoint in the application 216. The application 216 may include predictors, outputs and outcomes (not shown in Figures). The predictors are configured to push the data relevant to the dispute information 102 provided by the customer 202, for initiating the analysis of the dispute information 102. This may be accomplished by comparing keywords in the dispute information 102 with the data existing in the system 208 and pushing the data whose keywords match with the dispute information 102. The outputs enable the customer 202 to fetch the results or scores for the new or historical disputes. The outcomes enable the customer 202 to view the outcome of the analysis performed by the system 208. The outcomes may be used by the system 208 for model retraining and analytics or diagnostics.

In an example scenario, the customer 202 may interact with the server 214 via the application 216 for resolving the billing dispute. During the interaction, the server 214 is configured to receive the dispute information 102 pertaining to the dispute from the customer 202. The server 214 is configured to compute a score for the billing dispute based on the dispute information 102 for determining validity. The billing dispute is then categorized based on the computed score. The server 214 thereafter presents one or more actions to the one or more parties associated with the dispute information based on the category, for resolving the billing dispute, which is explained in detail in subsequent sections of the detailed description. The server 214 is also configured to prioritize the billing dispute, based on the computed score and/or the category of the dispute information. This configuration ensures that the parties are handled or assigned with investigation of disputes based on priority, thereby mitigating the need for manually investigating each of the billing disputes of the customer 202.

The environment 200 further includes a database configured to store information pertaining to the dispute information 102 provided by the customer 202. The dispute information 102 (as already described in paragraph 24) may be the information provided by the customer 202 at the time of lodging or registering the dispute with the seller. The database 212 may also be configured to store data pertaining to the scores, the categories or any other data generated at the time of analysis of the dispute information 102 by the system 208. The database 212 may be maintained by a third party or embodied within the server 214.

Some examples of prioritizing and resolving the billing disputes are described with reference to FIG. 3.

Figure 3:
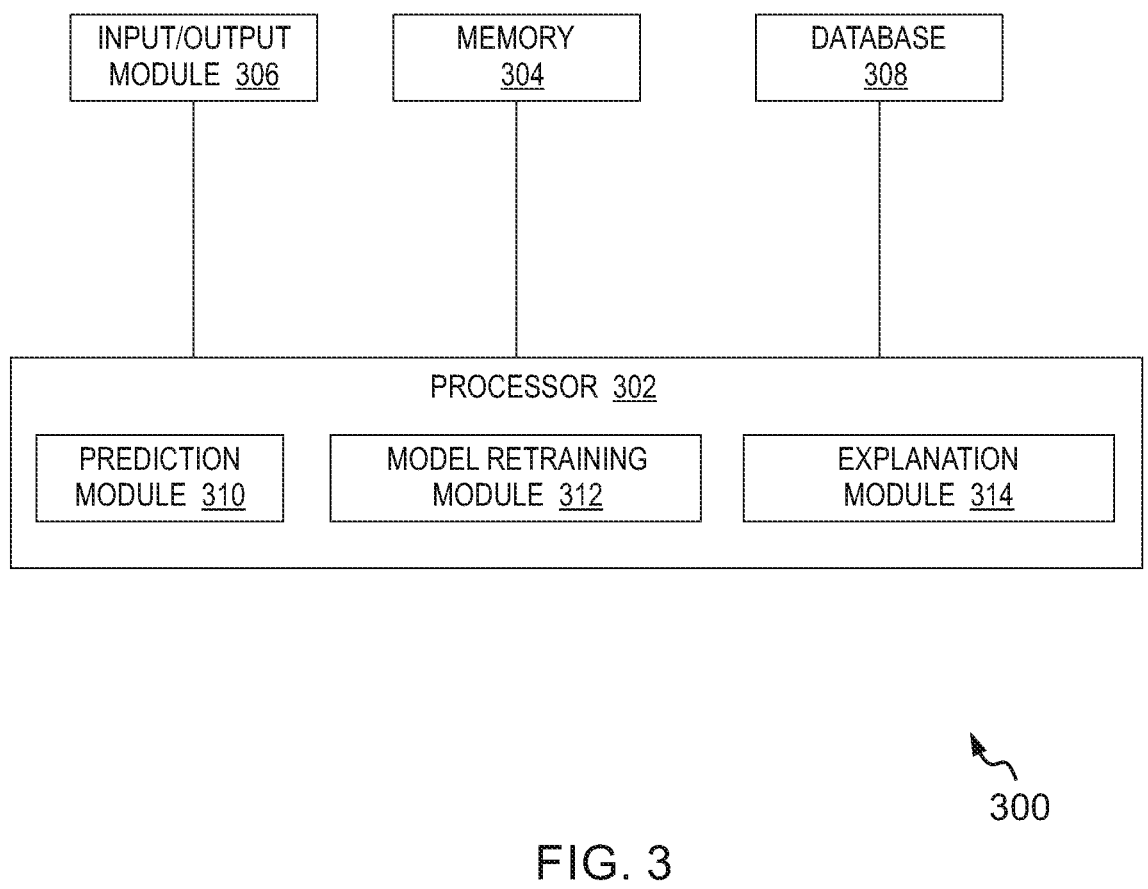
FIG. 3 is a block diagram representation of a system configured to prioritizing and investigating the billing disputes, in accordance with an embodiment of the present disclosure.

FIG. 3 in one exemplary embodiment of the present disclosure, is a block diagram representation 300 of the system 208 (shown in FIG. 2) configured for prioritizing and resolving the billing disputes. The system 208 includes various processing modules for prioritizing and resolving the billing disputes. The processing modules described herein may be implemented by a combination of hardware, software and firmware components.

The system 208 includes a processor 302, a memory 304, an input/output module 306, and a database 308. The processor 302 includes a prediction module 310, a module retraining module 312 and an explanation module 314. It is noted that although the system 208 is depicted to include only one processor 302, the system 208 may include a number of processors. Moreover, it shall be noted that the components are shown for exemplary purposes and the system 208 may include fewer or additional modules than those depicted in FIG. 3.

In an embodiment, the memory 304 is capable of storing machine-executable instructions. Further, the processor 302 is capable of executing the machine executable instructions to perform the functions described herein. The processor 302 embodies or is in communication with the components such as the predictions module 310, the module retraining module 312 and the explanation module 314. In an embodiment, the processor 302 may be embodied as a multi-core processor, a single core processor, or a combination of one or more multi-core processors and one or more single core processors. For example, the processor 302 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 302 may be configured to execute hard coded functionality. In an embodiment, the processor 302 is embodied as an executor of software instructions, wherein the instructions may specifically configure the processor 302 to perform the algorithms and/or operations described herein when the instructions are executed.

The memory 304 may be embodied as one or more volatile memory devices, one or more non-volatile memory devices, and/or a combination of one or more volatile memory devices and non-volatile memory devices. For example, the memory 304 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash memory, RAM (random access memory), etc.).

In an embodiment, the input/output module 306 may include mechanisms configured to receive inputs from and provide outputs to a customer, such as the customer 202 (as shown in FIG. 2) or the seller. To that effect, the input/output module 306 may include at least one interface and/or at least one output interface. The input/output module 306 may be configured to receive input (for e.g. dispute information 102 of FIG. 1) from the customer 202 for resolving the billing dispute, initiated by the customer 202. The input/output module 306 may also be configured to receive input from the seller or the merchant for receiving data pertaining to the billing dispute during the investigation of the dispute information 102.

The predictions module 310 may be configured to predict propensity of the dispute information 102 to be valid 108 or invalid 110 (as shown in FIG. 1). The propensity may be indicated via a probability, a numeral or any other format as per feasibility and requirement. The predictions module 310 may employ one or more machine learning techniques, for predicting or determining the propensity of the dispute information 102. As such, the one or more machine learning techniques are configured to ingest the dispute information 102 provided by the customer 202 and provide the predictions for each dispute. In one implementation, the predictions of the predictions module 310 may be raw predictions, which are probability indicating the propensity for a particular dispute to be deemed invalid after an investigation process. In another implementation, the predictions module 310 may be based on the binary valid or invalid outcomes taken from a historical data from the seller or the merchant. As such, the prediction may be in the form of a real number ranging between '0' and '1', wherein '0' indicating a hundred percent likelihood of the dispute information 102 being 'valid 108' and '1' indicating a hundred percent likelihood of the dispute information 102 being 'invalid 110'. The historical data may be the data pertaining to older or part transactions available with the seller, where a dispute might have been resolved.

Figures 11, 12:
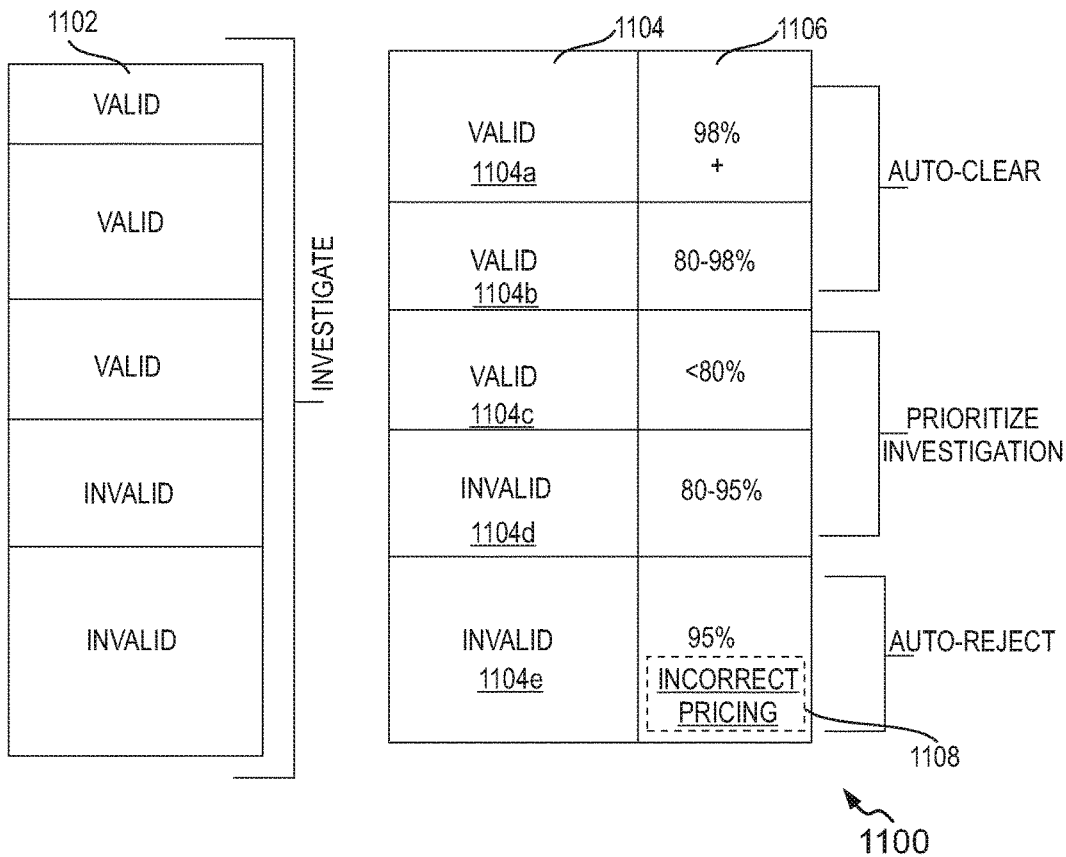
FIG. 11 is a schematic representation of a table, depicting ranking of the billing disputes based on the score computed by the system, in accordance with an embodiment of the present disclosure.
FIG. 12 is a schematic representation of a table, depicting categorization of the billing disputes based on the score computed by the system, in accordance with an embodiment of the present disclosure.

Further, the predictions of the module 310 may be a percentile, indicating a rank of the dispute in a whole population of disputes (for e.g. as shown in FIG. 12) based on the score computed by the system 208. In this configuration, the computed score may range between '1' and '100', with '1' being in the lowest 1 percent rank ordered by invalid probability and '100' being in the top 1 percent, which is explained in detailed in the description pertaining to FIG. 12. The predictions of the module 310 may also categorize the dispute based on the score computed by the system 208 (for e.g. as shown in FIG. 11), for queueing the disputes. The categorization may be performed by the module via workflow buckets that are configurable by the seller. In one implementation, five buckets or categories are maintained by the system 208 for categorization, wherein a first bucket includes disputes that are determined valid, while a fifth bucket includes disputes that are determined to be invalid. The disputes that are determined valid, i.e. the first bucket is configured with an "auto-clear" action, thereby automatically clearing the valid disputes from the list upon suitable compensation to the customer 202. The disputes that are determined invalid, i.e. the fifth bucket is configured with an 'investigate' action, thereby automatically involving the parties for investigating the dispute information 102 provided by the customer 202. It will be appreciated to those skilled in the art that the number of buckets and its boundaries may be configured based on the customer's requirement.

In an embodiment, the prediction module 310 may predict a reason code (for e.g. as shown in FIG. 11), typically for assigning the actions suitably. The reason code may be an appropriate label determined by the module 310 based on the analysis. As an example, the label may be 'no shipment', 'incorrect pricing' or any other label based on the discrepancies claimed by the customer 202. For determining the label for each dispute, the one or more machine learning techniques may be employed. In one implementation, the label for each dispute may be derived based on the historical data available with the seller for the customer 202.

Figure 4:
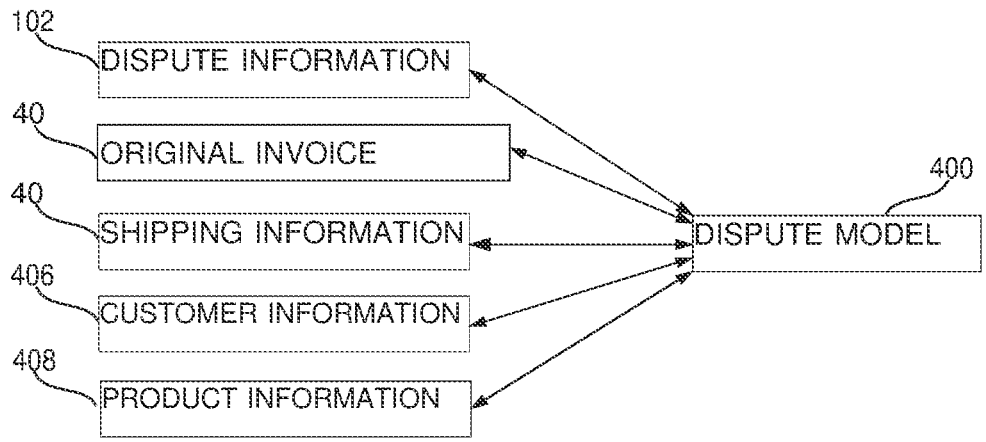
FIG. 4 is a block diagram representation of a dispute model configured by the system, in accordance with an embodiment of the present disclosure.

In an embodiment, the prediction module 310 may create a dispute model 400 (for e.g. as shown in FIG. 4) based on the data provided by the customer 202 (or the historical data). The customer 202 may provide the data via the application 216 or via a business management system (for e.g. an Enterprise Resource Planning (ERP) system) integrated to the system 208, which is explained in detail in subsequent sections of the description. The dispute model 400 typically encapsulates all the information pertaining to a transaction complied or initiated by the customer 202 with the seller. Non exhaustively, the dispute model 400 includes the dispute information 102, an original invoice information 402, a shipping information 404, a customer information 406 and a product information 408. The original invoice information 402 may include details pertaining to a bill, issued upon completion of the transaction between the customer 202 and the seller. Accordingly, the original invoice information 402 may include details such as a timestamp of the transaction, a transaction value, tax details, warranty details of the product purchased, offer details or any other details as per feasibility and requirement. The shipping information 404 typically includes a shipping address mentioned by the customer 202 at the time of initiating the transaction with the seller. In one implementation, the shipping information 404 may be the information at which the seller is required to provide or deliver service to, such as, for example, an electrical maintenance work to an on-site device. The customer information 406 typically includes details related to the customer 202 that are sufficient enough for initiating and complying the transaction for the seller. The customer information 406 may include a name, contact details, a residential address or any other details as per feasibility and requirement. The product information 408 includes the details pertaining to the product which the customer 202 has purchased from the seller. In one implementation, the product information 408 may also include details pertaining to a service provided by the seller to the customer 202. As such, the product information 408 may include details pertaining to a name of the product, a configuration of the product, a product specification, a product manufacturer information, consumer goods, groceries or any other information as per feasibility and requirement.

The model retraining module 312 is configured to retrain the system 208 periodically, preferably weekly or monthly. The retraining module 312 encapsulates the script necessary for retraining the system 208 by employing or incorporating fresh data and outcomes to the system 208. This configuration of the module 312 ensures that the system 208 is updated periodically with the latest information, so that the computation and the predictions are accurate.

Figure 5:
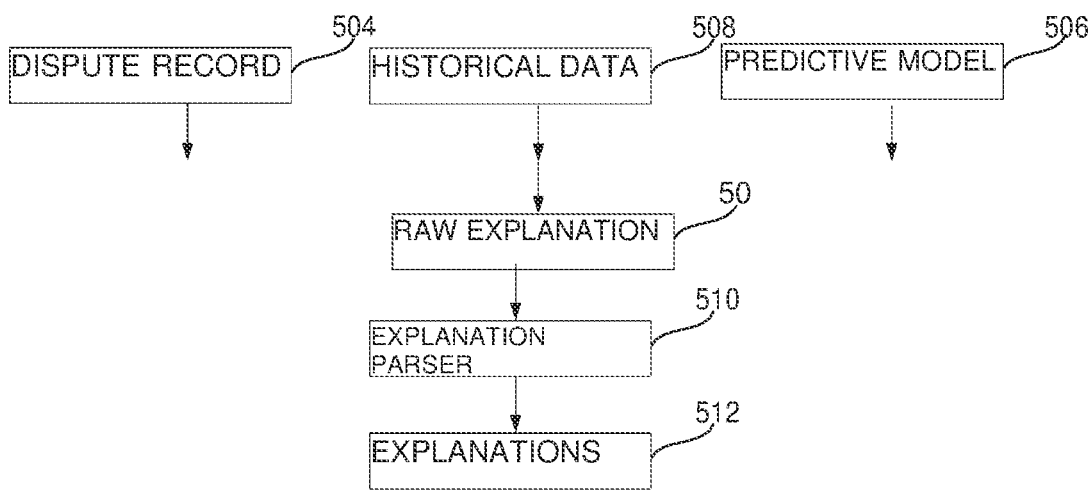
FIG. 5 is a block diagram representation of an explanations module for generating one or more features, in accordance with an embodiment of the present disclosure.

The explanation module 314 is configured to provide explanation for each of the predictions generated by the module 310. In other words, the explanation module 314 is configured to create raw explanations 502 (for e.g. as shown in FIG. 5) for each dispute to which, predictions are generated by the prediction module 310. This configuration of the prediction module 314 ensures that the customer 202 is provided with a reasoning or an explanation for arriving at the computed score and the categorization of the dispute. Referring to FIG. 5, the raw explanation 502 is created for each dispute by the module 314 based on a dispute record 504, a predictive model 506 and the historical data 508. The dispute record 504 may include data that is processed through the prediction module 310, such as the dispute information 102, the shipping information 404 and the like. The predictive model 506 may be a model which provides information in a step-by-step manner regarding the analysis performed by the prediction module 310. The historical data 508, as already described, includes data used for model training of the system 208. The raw explanation 502 is parsed by an explanation parser 510. The explanation parser 510, operates similar to conventional parser technologies, is configured to deduce the most influential variables for each record or data. These influential variables are combined to form easy to read sentences, for ease of understanding of the parties. Based on the output from the explanation parser 510, the parties may consider suitable actions for resolving the dispute.

Further, the explanation module 314 is also configured to generate one or more features (not shown in Figures). The one or more features may be the data deciphered by the explanation module 314 from the raw data provided by the customer, for ease of analysis and accuracy of the prediction. In one implementation, the one or more features may be the information deciphered from the dispute information 102, the related bill or the customer information 406. The explanation module 314 may be configured to augment the raw data, by dividing or segmenting the raw data into fragments for ease of analytics. As an example, the explanation module 314 may be configured to break the data pertaining to the date of the bill into, a day of week, a month, monetary averages, customer category, dispute category or other combination of fields as per feasibility and requirement. In another implementation, the explanation module 314 may be configured to divide the data based on the historical data 508. The system 208 (which may be FLOWCAST) may employ time-series information for generating features specific to a new dispute, such as the dispute amount filed over past 30 days, recent month-over-month increase in disputed amount for this customer, recent behavior of this particular dispute category, etc. The historically derived features may carry different information than the dispute information 102 itself, and add value to the predictive model 506, for increasing accuracy and stability of the predictions over time.

Additionally, the system 208 includes the database 308 configured for storing information pertaining to the dispute information 102. The database 308 may also be configured to store information exchanged or generated during each step of the analysis by the processor 302, for prioritizing and resolving the billing dispute. The database 208 may be encrypted suitably for ensuring the security of the stored information. The database 208 may also be configured to maintain log of the data processed by each of the modules (such as the prediction module 310, the model retraining module 312 and the explanation module 314) within the processor 302. The log allows the customer 202 to track and understand the analysis performed by the processor 302. In an embodiment, the database 208 may be configured to store information pertaining to the customer 202, such as a customer profile (not shown in Figures).

The various modules of the system 208, such as the processor 302, the memory 304, the I/O module 306, the database 308, the prediction module 310, the model retraining module 312 and the explanation module 314 may be configured to communicate with each other through a centralized circuit system (not shown in Figures). The centralized circuit system may be various devices configured to, among other things, provide or enable communication between the components (302-314) of the system 208. In certain embodiments, the centralized circuit system may be software-based, a central printed circuit board (PCB) such as a motherboard, a main board, a system board, or a logic board. The centralized circuit system may also, or alternatively, include other printed circuit assemblies (PCAs) or communication channel media. In some embodiments, the centralized circuit system may include appropriate communication interfaces to facilitate communication between the processor 302 and the components 304 to 314. The database 308 may communicate with the processor 302 using suitable storage interface such as, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 302 with access to the data stored in the database 308.

Figure 6:
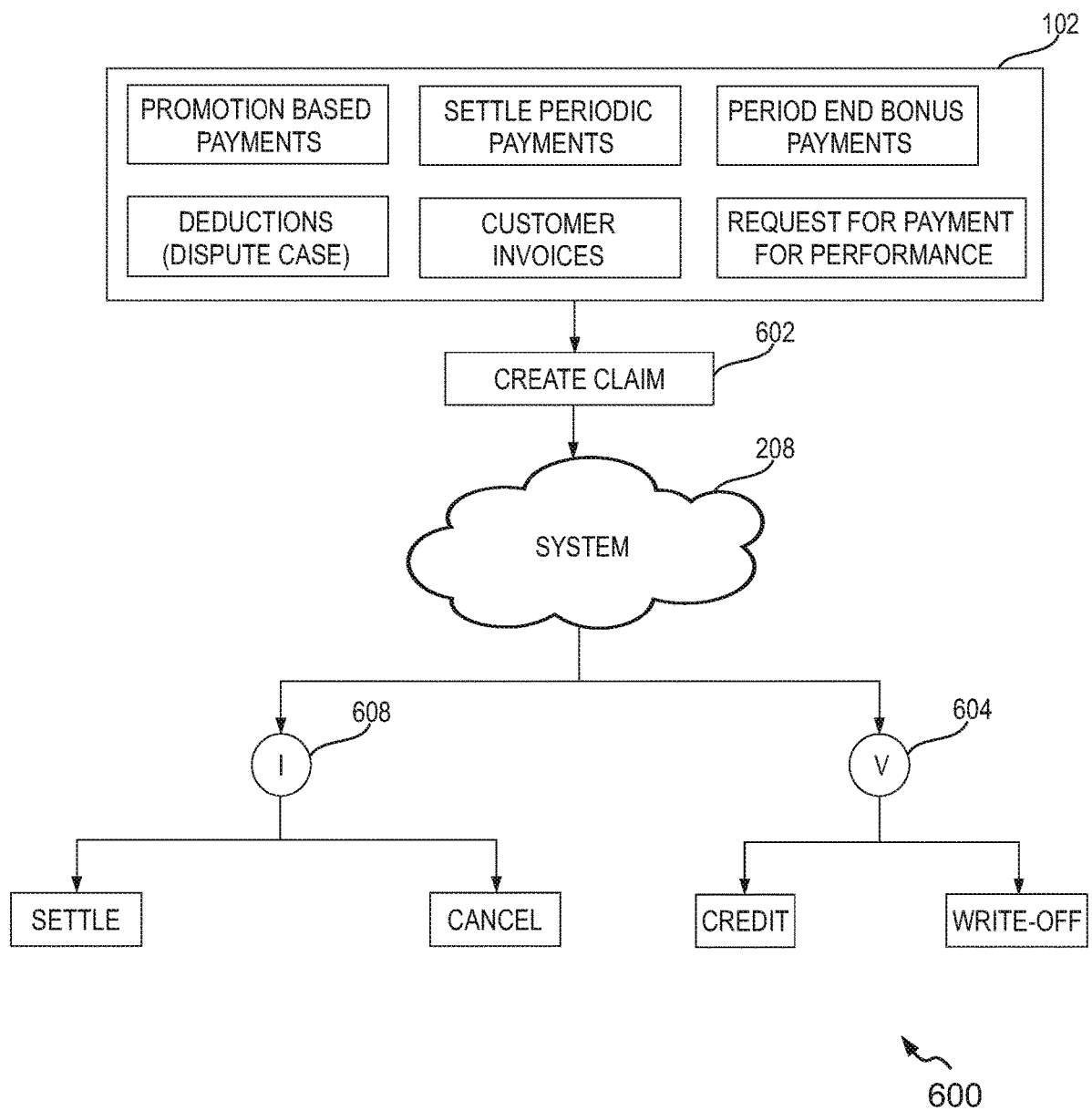
FIG. 6 illustrates an example representation for generating a claim decision or prediction prior to investigation by the system using machine learning techniques, in accordance with an embodiment of the present disclosure.

FIG. 6 illustrates an example representation 600 for generating a claim decision or prediction before investigation by the system 208 using machine learning techniques, in accordance with an example embodiment of the present disclosure. As illustrated, the customer 202 (for e.g. as shown in FIG. 2) provides the relevant dispute information 102 (already described with reference to FIG. 1) to the system 208 via the application 216 (already described with reference to FIG. 2). The dispute information 102 is processed by the system 208 for determining the validity, via the processor 302 using one or more machine learning techniques as described above. The system 208 creates a claim 602 upon receiving the dispute information 102. In one implementation, the system 208 may also employ one or more Artificial Intelligence (AI) methodologies for processing the dispute information 102, which is explained in detail in subsequent sections of the description. The analysis of the dispute information 102 results in determining whether the dispute is valid 604 or invalid 608. If the dispute is valid 604, then the customer 202 is suitably compensated, such as but not limited to, by writing off balance amount or by providing a credit to the customer 202. If the dispute is invalid 608, then the customer 202 suitably compensates the seller or the merchant, such as but not limited to, by settling the dispute by writing a good-will or by settling payment of balance amount or by cancelling the claim.

Figure 7:
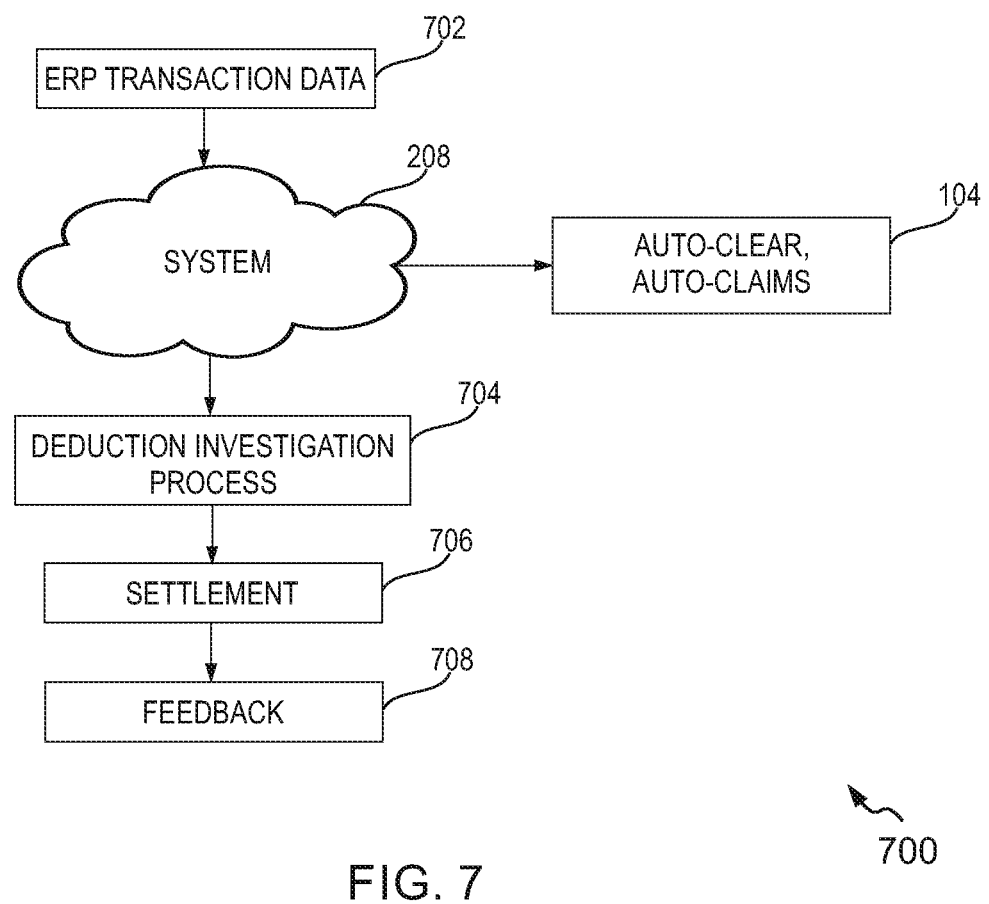
FIG. 7 is a block diagram illustrating a plug-in solution to an existing process or workflow, in accordance with an embodiment of the present disclosure.

FIG. 7 illustrates a plug-in solution for an existing process or workflow 700 of the seller, in accordance with an example embodiment of the present disclosure. The customer 202 provides the dispute information 102 to the system 208 when a discrepancy is determined in a transaction. In an example scenario, the transaction may include an ERP transaction data 702. In such scenario, the customer 202 may provide the dispute information 102 to the system 208 via the application 216, which can be an ERP system. The ERP system may be linked to the system 208, so that the dispute information 102 is routed to the system 208. The ERP system may also be configured to determine a generic 'root cause' of the dispute. As such, the ERP system may determine a 'reason code' based on the root cause of the dispute. The reason code may be one of a pricing problem, a quantity problem, the shipment not received and so on. In one implementation, the ERP system may be configured with the one or more machine learning techniques for predicting the root cause of the dispute. On receiving the dispute information 102, the system 208 generates predictions and associated fields as already described. The predictions are utilized by the seller for incorporating in the workflow and for driving different possibilities on the predictions of the dispute.

The dispute information 102 is processed to an investigation stage 704 by the system 208 for determining its validity, as already described. The investigation may result in determining the score of the dispute information 102 and then categorized suitably. The system 208 is thereafter configured to auto clear 104 the disputes with lower scores with no effort from parties associated with the dispute information 102, by suitably compensating the customer 202. The remaining disputes in the system 208 are investigated based on priority assigned to each dispute. The priority may be assigned by the system 208 based on parameters such as, but not limiting to, the computed score, urgency of the request, expiry of the request or any other suitable parameter as per feasibility and requirement. In one implementation, the system 208 may direct the parties to investigate the disputes, which has the highest likelihood of being invalid. The dispute is thereafter processed to a settlement stage 706, where the customer 202 is compensated suitably based on validity of the dispute information 102. Further, the dispute is processed to a feedback stage 708, where actual outcomes of the investigated disputes are provided as feedback to the system 208. The feedback is utilized for model training and analytics.

Figure 8:
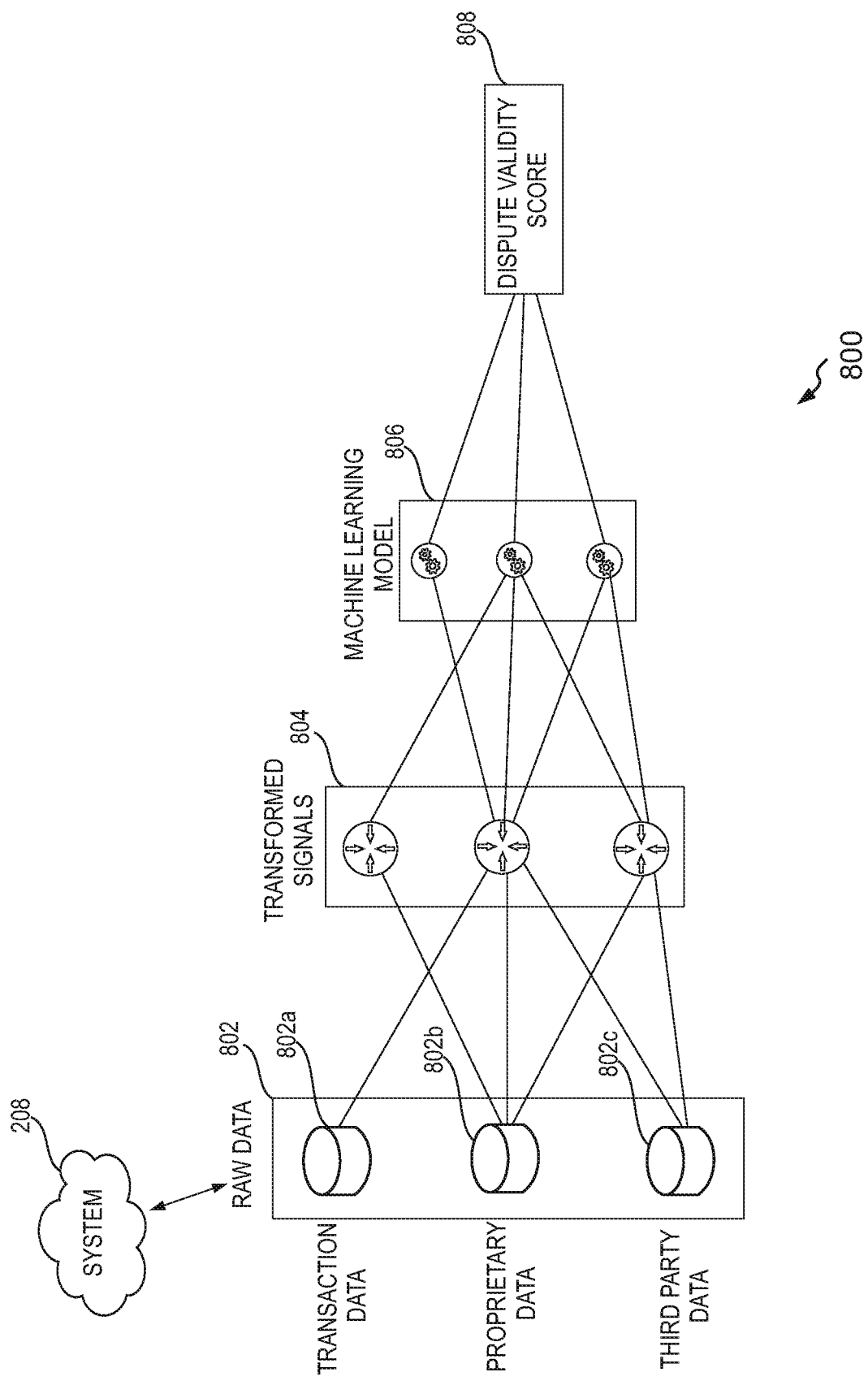
FIG. 8 is a block diagram illustrating a process for converting disparate data sources into a single decision, in accordance with an embodiment of the present disclosure.

FIG. 8 illustrates a schematic view of a process 800 for converting disparate data sources into a single decision, in accordance with an example embodiment of the present disclosure. The system 208 may include a raw data block 802, a transformed signals block 804, a machine learning model block 806 hereinafter referred to model block 806 and an outcome block 808. The raw data block 802 relates to a data block configured to receive the dispute information 102 and/or any other data pertaining to the dispute. The raw data block 802 includes a transaction data block 802a for receiving data pertaining to the transactions, a proprietary data block 802b for receiving data pertaining to the customer 202 and a third-party data block 802c for receiving data pertaining to parties or seller or any other person.

The system 208 accesses raw data in the raw data block 802. The raw data is transformed into usable signals by the system 208. The usable signals are stored in the transformed signal block 804. The transformation of the raw data may be performed by generating the one or more features as already described in FIG. 2. Upon transforming the raw data, the system 208 processes the usable signals and generates a model for analysis of the data by employing one or more machine learning techniques. The model is stored in the model block 806. The data is thereafter processed to the outcome block 808 that tunes the data for different business outcomes. The different outcomes may be target dollars collected, valid or invalid probability, likelihood of collecting the amount and the like as per feasibility and requirement. The data is thereafter consolidated to determine dispute validity score, which can be used by the seller for designing his workflow.

Figure 9:
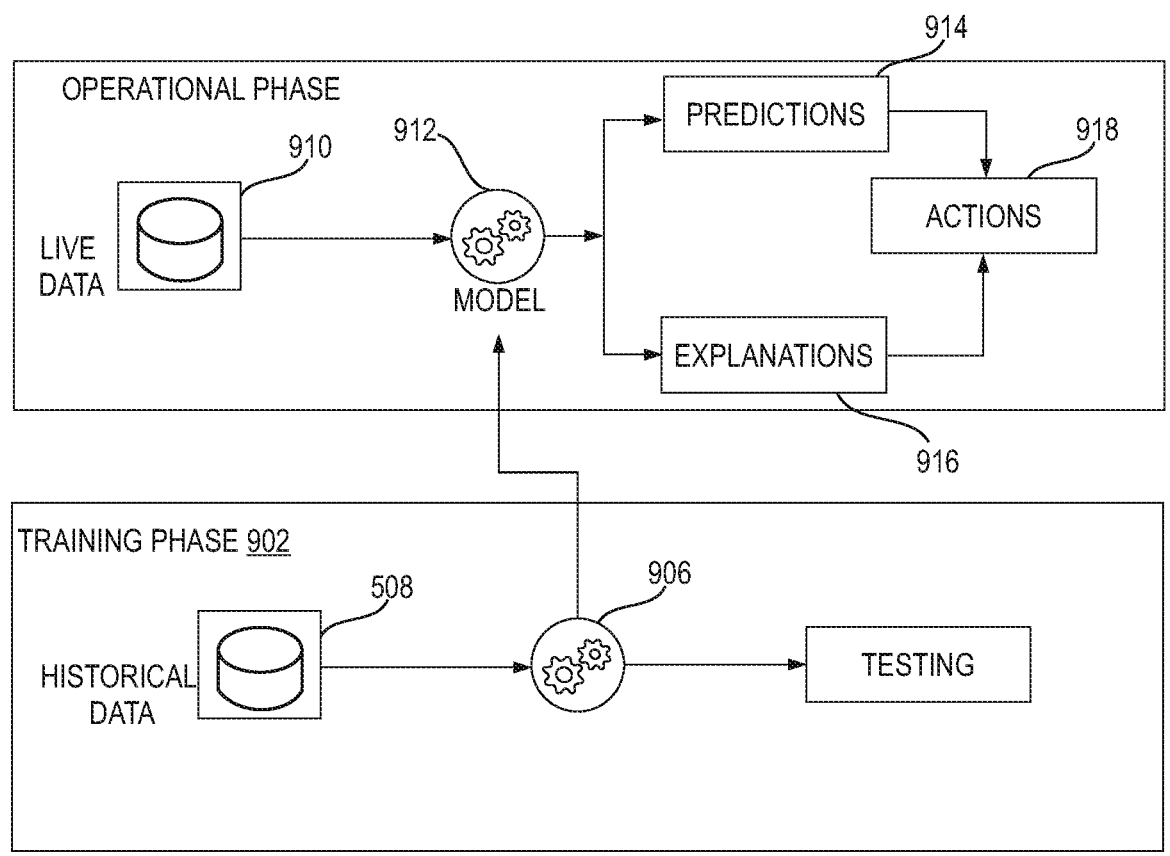
FIG. 9 illustrates a training phase and an operational or a production phase of a machine learning model of the system, in accordance with an embodiment of the present disclosure.

FIG. 9 illustrates a training phase 902 and an operational or production phase 904 of a machine learning model of the system 208, in accordance with an example embodiment of the present disclosure. Initially, a model, such as model 906 generated by the system 208, is calibrated based on an outcome of a historical data, such as historical data 508 described in FIG. 5. After the calibration, the model 906 is trained based on the historical data 508 by comparing the outcome obtained with a desired result. Once a required level of accuracy is obtained in the outcome for the historical data 508, a live data 910 (or a new dispute received provided by the customer 202) is fed to the model 906

The model 906 is configured to be a live model 912 upon receiving the live data 910. In one configuration, as the historical data 508 and live data 910 may be identical. In such configuration, the code path in both the training phase 902 and the operational phase 904 may be identical. The live model 912 processes the live data 910 to provide predictions 914, which are provided to the customer 202 via the application 216. Explanations 916, such as explanations 512 as described in FIG. 5 may be provided as an optional feature. The explanations 916 generates reasons for the predictions 914 of the dispute, which is also provided to the customer 202 via the application 216. The system 208 may suggest suitable actions 918 to the seller or the customer 202 based on the predictions 914 and the explanations 916.

Figure 10:
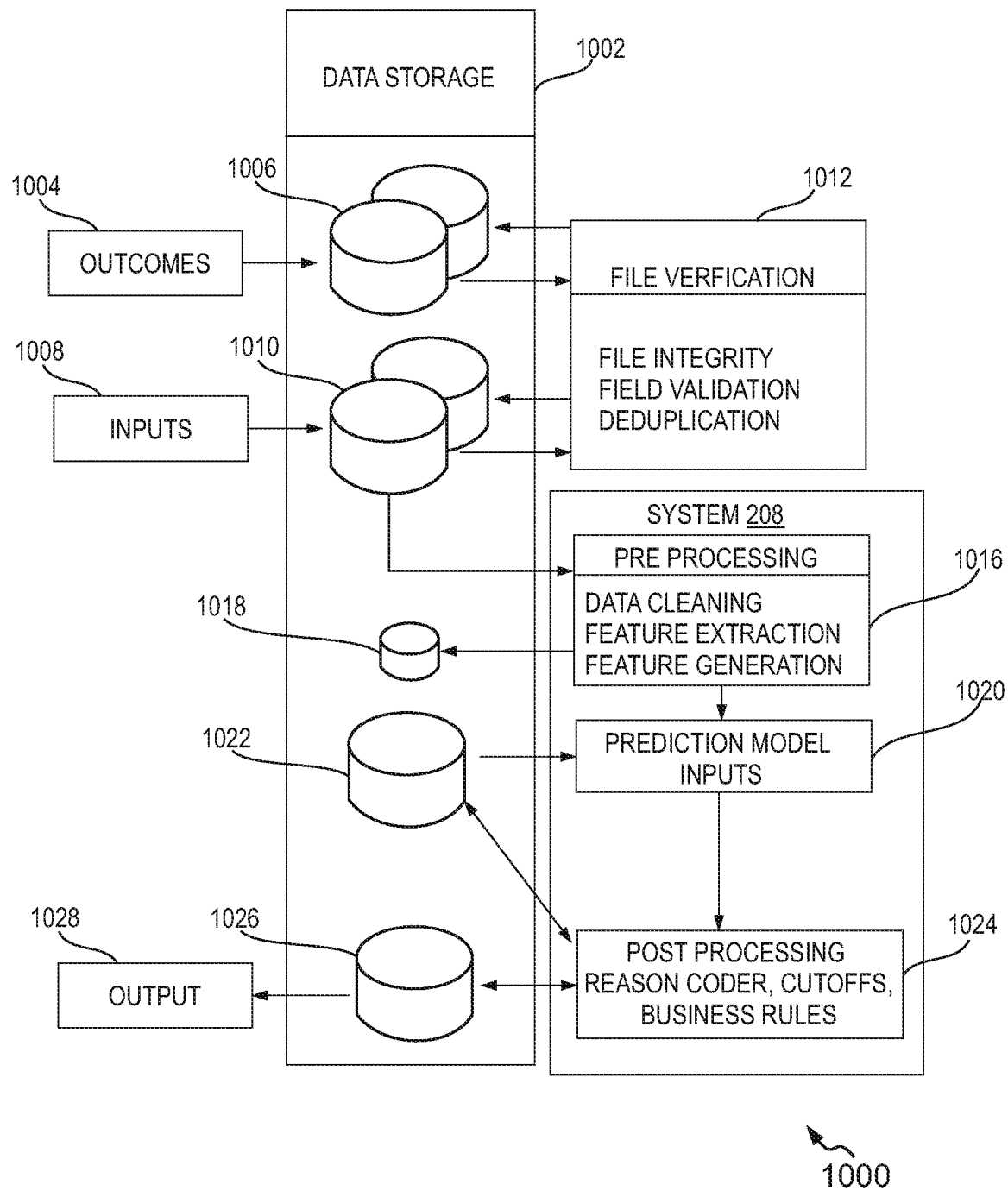
FIG. 10 is a block diagram representation depicting modules and data storage necessary for operation of the system, in accordance with an embodiment of the present disclosure.

FIG. 10 is a block diagram 1000, which depicts modules and data storage necessary for operation of the system 208. The block diagram includes a data storage 1002 that stores a raw file cloud storage data, such as SQL Outcomes 1006, SQL Daily Raw Files 1010, SQL Processed Rows 1018, Model Objects 1022, SQL Outputs 1026. The data storage 1002 is accessed at various instances during the process flow of the system 208. Outcomes 1004 and inputs 1008 are ingested by the application 216 and written to permanent storage in a cloud storage, (for e.g. Amazon Web Services (AWS) cloud), such as SQL Outcomes 1006 and SQL Daily Raw Files 1010 respectively. The files are then verified under file verification 1012. During operation of the system 208 (also referred as AI engine), data in the SQL Daily Raw Files 1010 is scanned for fetching the new disputes. These disputes are then processed in a pre-processing unit 1016 to make fields that are necessary to run prediction model (for e.g. model 906 in FIG. 9). This intermediate processed record is stored in a database, such as the SQL Processed rows 1018. The processed rows are sent to a prediction unit 1020, which requires a model stored in Model Objects 1022 (or a predetermined model) to be loaded (either locally or typically in general cloud storage) for determining predictions. The predictions are provided as input to a post processing unit 1024. The post processing unit 1024 uses the predictions for reason codes, cut-offs and business rules. The output of the post processing unit 1024 are logged in a database of SQL Outputs 1026. The SQL Outputs 1026 are fetched by output unit 1028 for generating output fields.

FIG. 11 is a schematic representation 1100 of a table depicting categorization of the billing disputes by the system 208, in accordance with an example embodiment of the present disclosure. In an embodiment, the disputes are categorized based on the score of each dispute computed by the system 208. In one implementation, the system 208 categorizes the disputes based on score computed in the probability format. The categorization includes a workflow column, such as workflow column 1104. The workflow column 1104 includes a predetermined number of rows. The number of rows may be determined based on number of categories the system 208 intends to segregate the disputes.

For example, the system 208 is configured to categorize the disputes into 5 categories. As such, the workflow column 1104 is configured with five rows, such as rows 1104a-1104e shown in FIG. 11. Each of the rows in the workflow column 1104 includes outcome and/or one or more actions corresponding to the outcome. As an example, the row 1104a includes a 'valid' outcome and an 'auto-clear' action. Thus, when a dispute is categorized in row 1104a, the system 208 automatically indicates the dispute to be auto cleared without employing any parties for investigating the dispute. Similarly, the row 1104e is configured with an 'invalid' outcome and an 'auto-reject' action. Thus, when a dispute is categorized in row 1104e, the system 208 automatically rejects the dispute. As another example, the row 1104c is configured with a 'valid' outcome and a 'prioritize investigation action'. Thus, when the dispute is categorized in the row 1104c, the system 208 automatically indicates the parties to prioritize investigation for the dispute. The investigation may be prioritized based on the scores or any other parameter as per feasibility and requirement. A reason may also be provided (not shown in Figures) by the system 208, for auto-rejecting or auto-clearing the dispute. In one implementation, the system 208 may include a machine learning algorithm that assigns weights and/or parameters to each of the variables in the prediction model (such as model 906 and model 912 shown in FIG. 9), used for computing the score. Various parameters related to the dispute are considered for inclusion in the predictive model, such as transaction amount, products disputed, or historical behavior of the disputing party. As such, the system 208 may assign appropriate weights and/or parameters for each of the variables in the model, the net effect of which is to produce the overall score.

Further, a score column 1106 is also configured adjacent to the workflow column 1104. The score column 1106 is configured to indicate the score determined for each of the rows, so as to indicate the criteria for categorizing the dispute in a particular row. As an example, for row 1104a, the score may be set to be greater than 98%. In other words, the system 208 adds the disputes in the row 1104a, if its score is greater than 98%. Similarly, for row 1104e, the score may be set to be 95%. Thus, the system 208 is configured to add the disputes in the row 1104e, if its score is 95%. The format of the score mentioned in the score column 1106 may be selected to be one of a probability score, a positive integer or a percentage or any other format as per feasibility and requirement. Further, the score column 1106 may also include a reason code 1108 (as already described in FIG. 3). The reason code 1108 may determine the reason for categorizing the dispute in that particular row. This configuration ensures that, investigation is channeled efficiently, while also prioritizing the investigation process, thereby mitigating the requirement for investigating each dispute irrespective of whether they are valid disputes or invalid disputes (for e.g. column 1102 as shown in FIG. 11).

FIG. 12 illustrates a schematic representation of a table 1200 depicting scores for disputes by the system 208, in accordance with an example embodiment of the present disclosure. The table 1200 may include a score band 1202 with a plurality of rows 1202a-1202h. Similar to the table 1100 described in FIG. 11, each of the row in the plurality of rows 1202a-1202h is configured with a pre-set score, so that the dispute which satisfies the pre-set score is designated in that row. In an example, the pre-set score may range from '1' to '5'. For instance, row 1202a may be configured with the score of '5', while the row 1202h may be configured with the score of '1'. Further, for each row of the score band 1202, an associated action is predicted. The predicted action is collated in an action band 1204 positioned adjacent to the score band 1202. For instance, for the score of "1" the 'auto-clear' action may be provided. Thus, a dispute with a score of '1' indicates that the dispute is valid and accordingly the dispute is auto cleared or compensated suitably to the customer 202. The dispute with a score of '5' indicates that the dispute is invalid and accordingly the dispute is rejected.

Similarly, for scores that fall between "2-4", the 'investigate' action may be provided, which signifies that the dispute can be investigated and indicates probability of invalidity. Further, for the score of "5" the 'auto-reject' action may be provided, which suggests that the dispute is invalid and can be auto-cleared. For each dispute, the score band 1202 (also referred to as workflow bucket) is provided to the customer 202 who uses it to drive various workflows. The customer 202 may therefore auto-clear and auto-reject the disputes appropriately, while using the remaining buckets for dispute investigation prioritization. In other words, the customer concentrates on those disputes that are ranked the highest (i.e. with highest scores) and then spends time on the next group and so on. Thereby, the customer does not waste time on the least likely invalid dispute and spends most time on the likeliest to be invalid.

Figure 13:
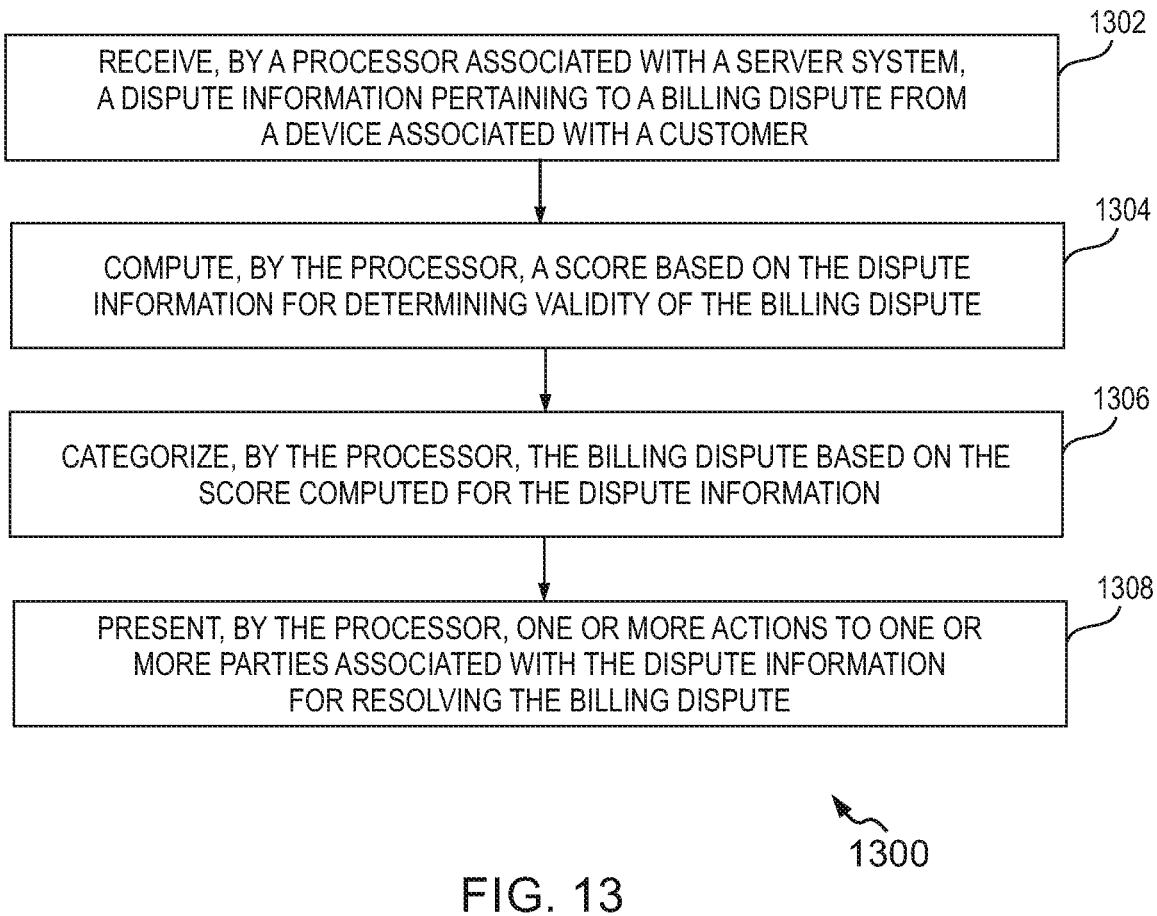
FIG. 13 is a flow diagram for a method for prioritizing and resolving the billing disputes, in accordance with an embodiment of the present disclosure.

FIG. 13 in one exemplary embodiment of the present disclosure is a flow diagram for a method 1300 for prioritizing and resolving the billing disputes. The method 1300 depicted in the flow diagram may be executed by, for example, the server 214 or the system 208. Operations of the method 1300 and combinations of operation in the flow diagram, may be implemented by, for example, hardware, firmware, a processor, circuitry and/or a different device associated with the execution of software that includes one or more computed program instructions.

At operation 1302, the method 1300 includes receiving, by a processor associated with the system 208, a dispute information 102 pertaining to a billing dispute from a device 204 associated with a customer. In an example embodiment, the customer 202 provides the dispute information 102 to the system 208 via an application interface in the device, such as the application 216 described with reference to FIG. 2. The dispute information 102 may be at least one of the invoice information 402, the customer information 406, the shipping information 404, the product information 408 and the sales team information. On receiving the dispute information 102, the system 208 generates the one or more features of the disputes for ease of analysis, which is described in FIG. 5.

At operation 1304, the method 1300 includes computing, by the processor, the score based on the dispute information 102 for determining validity of the billing dispute. In an example embodiment, the system 208 determines the validity of the dispute based on the computed score. In one implementation, the system 208 may assign a rating or a value or a weightage (not shown in the Figures) for parameters that are considered in prediction model (such as model 906 and model 912 shown in FIG. 9), used for computing the score. The parameters considered for the computation, may be amount of the transaction, frequency of transaction from the customer or any other suitable parameter required for computation. As such, the system 208 may assign the weightage for each of the parameter matching with the model. The weightages are collated for determining the score. In one implementation, the score is determined based on the score matching a historical data of transactions, such as historical data 508 shown in FIG. 5. The system 208 may also provide reasons or explanations for computing the score. The format of the computed score may be at least one of the probability score, the percentage value and the positive integer.

At operation 1306, the method 1300 includes categorizing, by the processor, the billing dispute based on the score computed for the dispute information. In an example embodiment, the system 208 categorizes the billing dispute based on the computed score (as described in FIG. 12). The dispute information 102 based on the computed score is configured to categorize the billing disputed into the valid billing dispute and the invalid billing dispute. The categorization enables the customer 202 or the seller to derive a workflow. The categorization also helps the seller or the customer 202 to recognize the disputes that require effort for resolution. Further, a reason code is generated for presenting one or more actions to the one or more parties to resolve the billing dispute. The reason code includes explanation for categorizing the dispute information 102 based on the computed score.

At operation 1308, the method 1300 includes presenting, by the processor, one or more actions to one or more parties associated with the dispute information 102 for resolving the billing dispute. The one or more actions include at least complying with the billing dispute via one or more parties, when the dispute information 102 is categorized as the valid billing dispute and investigating the dispute via the one or more parties, when the dispute information 102 is categorized as the invalid billing dispute. In an example embodiment, the system 208 presents the one or more actions to the one or more parties for resolving the dispute. The one or more actions are provided for each of the category the dispute that are divided into the valid dispute or the invalid dispute. The actions may be one of auto-clear, auto-reject or investigate, based on the category as described with reference to FIG. 11. Thus, the system 208 based on the category presents or suggests the action to be taken for efficient resolution of the billing disputes.

Figure 14:
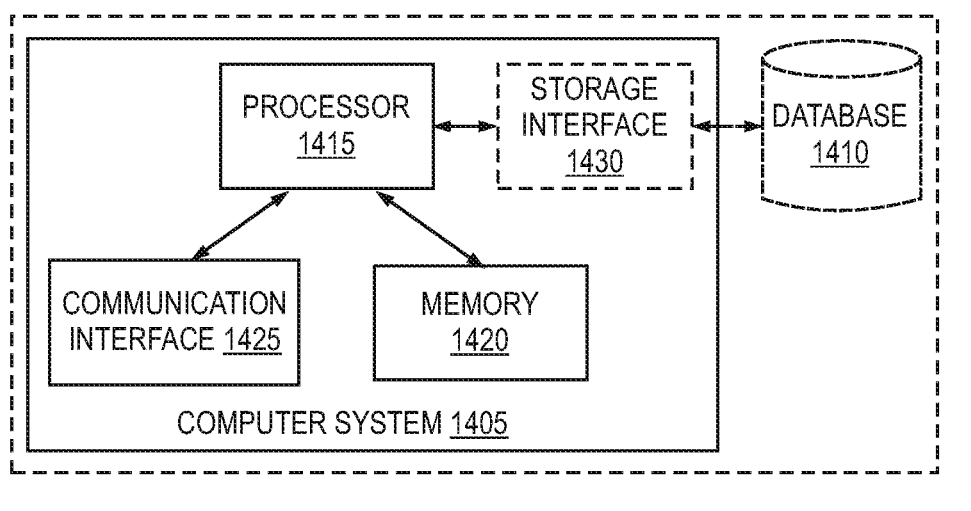
FIG. 14 is a block diagram of a server capable of implementing at least some embodiments of the present disclosure.

FIG. 14 illustrates a block diagram representation of a server 1400 capable of implementing at least some embodiments of the present disclosure. The server 1400 is configured to host and manage the application 216 that is provided to an electronic device such as the device 204, in accordance with an example embodiment of the disclosure. An example of the server 1400 is the server 214 shown and described with reference to FIG. 2. The server 1400 includes a computer system 1405 and a database 1410.

The computer system 1405 includes at least one processor 1415 for executing instructions. Instructions may be stored in, for example, but not limited to, a memory 1420. The processor 1415 may include one or more processing units (e.g., in a multi-core configuration).

The memory 1420 is a storage device embodied as one or more volatile memory devices, one or more non-volatile memory devices, and/or a combination of one or more volatile memory devices and non-volatile memory devices, for storing micro-contents information and instructions. The memory 1420 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

The processor 1415 is operatively coupled to a communication interface 1425 such that the computer system 1405 is capable of communicating with a mobile device, for example, the device 204 or communicates with any entity within the network 206 via the communication interface 1425.

The processor 1415 may also be operatively coupled to the database 1410. The database 1410 is any computer-operated hardware suitable for storing and/or retrieving data, such as, but not limited to, the dispute information 102, information pertaining to the sales team or the merchant's team, data generated during analysis of the dispute information 102, such as scores for the disputes, categories of the disputes, predictions and explanations of the scores, and the like. The database 1410 may include multiple storage units such as hard disks and/or solid-state disks in a redundant array of inexpensive disks (RAID) configuration. The database 1310 may include a storage area network (SAN) and/or a network attached storage (NAS) system.

In some embodiments, the database 1410 is integrated within the computer system 1405. For example, the computer system 1405 may include one or more hard disk drives as the database 1410. In other embodiments, the database 1410 is external to the computer system 1405 and may be accessed by the computer system 1405 using a storage interface 1430. The storage interface 1430 is any component capable of providing the processor 1415 with access to the database 1410. The storage interface 1430 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1415 with access to the database 1410.

The processor 1415 is communicably coupled with the memory 1420 and the communication interface 1425. The processor 1415 is capable of executing the stored machine executable instructions in the memory 1420 or within the processor 1415 or any storage location accessible to the processor 1415. The processor 1415 may be embodied in a number of different ways. In an example embodiment, the processor 1415 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. The processor 1415 performs various functionalities of the server 1400 as described herein.

The disclosed methods with reference to FIGS. 1 to 14, or one or more operations of the flow diagram 1200 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), mobile communications, or other such communication means.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer implemented method, comprising:
  receiving, by a processor associated with a system, a dispute information pertaining to a billing dispute from a device associated with a customer;
  computing, by the processor, a score using a predictive model based on one or more features for determining validity of the billing dispute, wherein the predictive model comprises variables to which weights are assigned by a machine learning algorithm, wherein the weights are collated for determining the score, and wherein the one or more features are generated by transforming raw data of the dispute information;
  categorizing, by the processor, the billing dispute based on the score computed for the dispute information;
  presenting, by the processor, one or more actions to one or more parties associated with the dispute information for resolving the billing dispute, wherein the one or more actions include auto-clear, auto-reject and investigate actions;

training, by the processor, a model by comparing the outcome obtained with a desired result, wherein the model is calibrated based on an outcome of a historical data, and transforming the model to the predicative model for providing predictions;

periodically retraining the predictive model, by the processor, to encapsulate the script for incorporating new data and outcomes;

creating, by the processor raw explanations for each dispute for the generated predictions, and parsing the raw explanations to deduce the most influential variables for each record or data, wherein, the influential variables are combined to form easy to read sentences, for ease of understanding of the parties.

2. The method as claimed in claim 1, wherein the dispute information provided by the customer via the device comprises at least one of:
   an invoice information;
   a customer information;
   a shipping information;
   a product information; and
   a sales team information.

3. The method as claimed in claim 1, wherein the categorizing of the billing dispute is based on a format of the computed score, the format of the computed score being at least:
   a probability value;
   a percentage value; and
   a positive integer.

4. The method as claimed in claim 1, further comprising, generating, by the processor, one or more features based on the dispute information and a preset data for computing the score for the dispute information, the one or more features comprise at least:
   details pertaining to the dispute information provided by the customer, the details comprising:
      a timestamp of the dispute information;
      a monetary information pertaining to the billing dispute;
      the dispute information received from the customer in a predetermined time period; and
      a billing dispute amount received by the customer over the predetermined time period.

5. The method as claimed in claim 1, wherein the processor is configured to categorize the dispute information based on the computed score into at least:
   a valid billing dispute; and
   an invalid billing dispute.

6. The method as claimed in claim 5, further comprising generating, by the processor, a reason code for presenting the one or more actions to the one or more parties to resolve the billing dispute, the reason code comprising explanation for categorizing the dispute information based on the computed score.

7. The method as claimed in claim 6, wherein the one or more actions presented by the processor comprise at least:
   complying with the billing dispute via the one or more parties, when the dispute information is categorized as the valid billing dispute; and
   investigating the dispute via the one or more parties, when the dispute information is categorized as the invalid billing dispute.

8. The method as claimed in claim 6, further comprising prioritizing, by the processor, investigation of the billing dispute based on the score computed by the processor for the dispute information provided by the customer.

9. A system, comprising:
   a memory comprising stored instructions; and
   a processor configured to execute the stored instructions to cause the system to perform at least:
      receiving a dispute information pertaining to a billing dispute from a device associated with a customer;
      computing a score using a predictive model based on one or more features for determining validity of the billing dispute, wherein the predictive model comprises variables to which weights are assigned by a machine learning algorithm, wherein the weights are collated for determining the score, and wherein the one or more features are generated by transforming raw data of the dispute information;
      categorizing the billing dispute based on the score computed for the dispute information;
      presenting one or more actions to one or more parties associated with the dispute information for resolving the billing dispute, wherein the one or more actions include auto-clear, auto-reject and investigate actions;
   training, by the processor, a model by comparing the outcome obtained with a desired result, wherein the model is calibrated based on an outcome of a historical data, and transforming the model to the predicative model for providing predictions;
   periodically retraining the predictive model, by the processor, to encapsulate the script for incorporating new data and outcomes; and
   creating, by the processor raw explanations for each dispute for the generated predictions, and parsing the raw explanations to deduce the most influential variables for each record or data, wherein, the influential variables are combined to form easy to read sentences, for ease of understanding of the parties.

10. The system as claimed in claim 9, wherein the dispute information provided by the customer via the device comprises at least one of:
    an invoice information;
    a customer information;
    a shipping information;
    a product information; and
    a sales team information.

11. The system as claimed in claim 9, wherein the categorizing of the billing dispute is based on a format of the computed score, the format of the computed score being at least:
    a probability value;
    a percentage value; and
    a positive integer.

12. The system as claimed in claim 9, wherein the processor is configured to generate the one or more features based on the dispute information and a preset data for computing the score for the dispute information, the one or more features comprising at least:
    details pertaining to the dispute information provided by the customer, the details comprising:
       a timestamp of the dispute information;
       a monetary information pertaining to the billing dispute;
       the dispute information received from the customer in a predetermined time period; and
       a billing dispute amount received by the customer over the predetermined time period.

13. The system as claimed in claim 9, wherein the processor is configured to categorize the dispute information based on the computed score into at least:
    a valid billing dispute; and
    an invalid billing dispute.

14. The system as claimed in claim 13, wherein the processor is configured to generate a reason code for presenting the one or more actions to the one or more parties for resolving the billing dispute, the reason code comprising explanation for categorizing the dispute information based on the computed score.

15. The system as claimed in claim 14, wherein the one or more actions, presented by the processor, comprise at least:
complying with the billing dispute via the one or more parties, when the dispute information is categorized as the valid billing dispute; and
investigating the dispute via the one or more parties, when the dispute information is categorized as the invalid billing dispute.

16. The system as claimed in claim 15, wherein the processor is configured to prioritize the investigation of the billing dispute based on the score computed by the processor for the dispute information provided by the customer.

17. A computer implemented method, comprising:
receiving, by a processor associated with a server system, a dispute information pertaining to a billing dispute from a device associated with a customer;
generating, by the processor, one or more features based on the dispute information and a preset data, the one or more features comprising at least:
details pertaining to the dispute information provided by the customer, the details comprising:
a timestamp of the dispute information, and
a monetary information pertaining to the billing dispute, the dispute information received from the customer in a predetermined time period, and billing dispute amount received by the customer over the predetermined time period, wherein generating the one or more features comprises:
comparing keywords in the dispute information with keywords of the preset data stored in the server system; and
identifying data, from the preset data, associated with the keywords that match with the keywords of the dispute information, wherein the identified data is used for generating the one or more features, and wherein the preset data is associated with historical billing disputes;
computing, by the processor, the score using a predictive model based on the one or more features-for determining validity of the billing dispute, wherein the predictive model comprises variables to which weights are assigned by a machine learning algorithm, wherein the weights are collated for determining the score, and wherein the one or more features are generated by transforming raw data of the dispute information;
categorizing, by the processor, the billing dispute based on the score computed for the dispute information, wherein the dispute information is categorized into at least:
a valid billing dispute, and
an invalid billing dispute;
generating, by the processor, a reason code for presenting one or more actions to one or more parties to resolve the billing dispute, the reason code comprising explanation for categorizing the dispute information based on the computed score;
presenting, by the processor, the one or more actions based on the reason code to the one or more parties associated with the dispute information for resolving the billing dispute, wherein the one or more actions presented comprises at least:
complying with the billing dispute via one or more parties, when the dispute information is categorized as the valid billing dispute, and
investigating the dispute via the one or more parties, when the dispute information is categorizes as the invalid billing dispute;
prioritizing, by the processor, the investigation of the billing dispute based on the score computed by the processor for the dispute information provided by the customer;
training, by the processor, a model by comparing the outcome obtained with a desired result, wherein the model is calibrated based on an outcome of a historical data, and transforming the model to the predicative model for providing predictions;
periodically retraining the predictive model, by the processor, to encapsulate the script for incorporating new data and outcomes; and
creating, by the processor raw explanations for each dispute for the generated predictions, and parsing the raw explanations to deduce the most influential variables for each record or data, wherein, the influential variables are combined to form easy to read sentences, for ease of understanding of the parties.

18. The method as claimed in claim 17, wherein the dispute information provided by the customer via the device comprises at least one of:
an invoice information;
a customer information;
a shipping information;
a product information; and
a sales team information.

19. The method as claimed in claim 17, wherein categorizing the billing dispute is based on a format of the computed score, the format of the computed score being at least:
a probability value;
a percentage value; and
a positive integer.

20. The method as claimed in claim 17, further comprising, storing, by the processor, the dispute information, the score and the reason code in a database.

* * * * *